(12) United States Patent
Mori

(10) Patent No.: US 11,906,391 B2
(45) Date of Patent: Feb. 20, 2024

(54) TIRE SYSTEM

(71) Applicant: DENSO CORPORATION, Kariya (JP)

(72) Inventor: Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 880 days.

(21) Appl. No.: 16/930,083

(22) Filed: Jul. 15, 2020

(65) Prior Publication Data
US 2020/0348212 A1 Nov. 5, 2020

Related U.S. Application Data

(63) Continuation of application No. PCT/JP2019/001311, filed on Jan. 17, 2019.

(30) Foreign Application Priority Data

Jan. 19, 2018 (JP) .................................. 2018-007423
Jun. 22, 2018 (JP) .................................. 2018-118776

(51) Int. Cl.
*G01M 17/02* (2006.01)
*B60C 11/24* (2006.01)
(Continued)

(52) U.S. Cl.
CPC ......... *G01M 17/025* (2013.01); *B60C 11/243* (2013.01); *B60C 23/0422* (2013.01); *B60R 16/0232* (2013.01); *G07C 5/0816* (2013.01)

(58) Field of Classification Search
CPC .............. G01M 17/025; B60C 11/243; B60C 23/0422; B60C 11/0332; B60C 11/246; B60C 23/0488; B60C 2019/004; B60C 11/24; B60C 19/00; B60R 16/0232; G07C 5/0816; B60W 40/06; B60W 2422/70;
(Continued)

(56) References Cited

U.S. PATENT DOCUMENTS 7,271,710 B2 *  9/2007  Saitou ................. B60C 23/0408
                                                340/447
10,460,226 B2 * 10/2019  Wei ......................... B60C 11/24
(Continued)

FOREIGN PATENT DOCUMENTS

JP          2004359119 A     12/2004
JP          2010241384 A     10/2010
(Continued)

*Primary Examiner* — Mohammad K Islam
(74) *Attorney, Agent, or Firm* — Harness, Dickey & Pierce, P.L.C.

(57) ABSTRACT

A tire system includes a tire-side device and a vehicle-body-side system. The tire-side device may be attached to a tire included in a vehicle. The vehicle-body-side system may be attached to a body of the vehicle. The tire-side device may output a detection signal corresponding to each of a plurality of types of detection targets. The tire-side device may perform processing of the detection signal and generate the data related to the detection target. The tire-side device may perform bidirectional communication with the vehicle-body-side system and transmit the data to the vehicle-body-side system. The vehicle-body-side system may perform bidirectional communication with the tire-side device and receive the data. The vehicle-body-side system may acquire the detection result for the detection target based on the data.

6 Claims, 8 Drawing Sheets

(51) Int. Cl.
  *B60C 23/04* (2006.01)
  *B60R 16/023* (2006.01)
  *G07C 5/08* (2006.01)

(58) Field of Classification Search
  CPC ........... B60W 2556/50; B60W 2556/55; B60T 2240/03; B60T 8/1725; G01G 19/10
  See application file for complete search history.

(56) References Cited

U.S. PATENT DOCUMENTS

| | | |
|---|---|---|
| 2004/0246117 A1 | 12/2004 | Ogawa et al. |
| 2011/0118989 A1* | 5/2011 | Morinaga ............... B60C 11/24 |
| | | 702/34 |
| 2011/0221587 A1 | 9/2011 | Katou |
| 2014/0008132 A1 | 1/2014 | Kamamann et al. |
| 2016/0159171 A1* | 6/2016 | Taki .................... B60C 23/0488 |
| | | 340/447 |
| 2016/0229236 A1* | 8/2016 | Taki .................... B60C 23/0489 |
| 2016/0368502 A1* | 12/2016 | Suzuki .................. B60W 40/06 |
| 2018/0264894 A1 | 9/2018 | Goto et al. |
| 2018/0312017 A1* | 11/2018 | Woodley ........... B60C 23/00354 |
| 2019/0047556 A1 | 2/2019 | Mori et al. |
| 2019/0225227 A1 | 7/2019 | Mori et al. |
| 2019/0241029 A1* | 8/2019 | Li ........................... G01L 17/00 |

FOREIGN PATENT DOCUMENTS

| | | |
|---|---|---|
| JP | 2011189795 A | 9/2011 |
| JP | 2016107833 A | 6/2016 |
| JP | 2017144975 A | 8/2017 |
| JP | 2017171241 A | 9/2017 |
| JP | 2017181168 A | 10/2017 |
| JP | 2018009974 A | 1/2018 |

* cited by examiner

TIRE SYSTEM

CROSS REFERENCE TO RELATED APPLICATIONS

The present application is a continuation application of International Patent Application No. PCT/JP2019/001311 filed on Jan. 17, 2019, which designated the U.S. and claims the benefit of priority from Japanese Patent Application No. 2018-7423 filed on Jan. 19, 2018 and Japanese Patent Application No. 2018-118776 filed on Jun. 22, 2018. The entire disclosures of all of the above applications are incorporated herein by reference.

TECHNICAL FIELD

The present disclosure relates to a tire system which includes a tire-side device and a vehicle-body-side system.

BACKGROUND

A method for determining a state of a road surface on which a tire is traveling has been proposed. In the method, an acceleration sensor is provided on a back surface of a tire tread and vibration applied to the tire is detected by the acceleration sensor. The state of the road surface is determined according to the detection result of the vibration. In this road surface state determination method, a feature vector is extracted from a tire vibration waveform detected by the acceleration sensor and the road surface state is determined by calculating a degree of similarity between the extracted feature vector and all of support vectors stored for each road surface type. For example, the degree of similarity between the extracted feature vector and all of the support vectors is calculated using a kernel function and the type of road surface with the highest degree of similarity is determined to be the state of the road surface on which the vehicle is traveling. The type of road surface may be a dry road surface, wet road surface, frozen road, or snow-covered road.

SUMMARY

The present disclosure provides a tire system. The tire system includes a tire-side device and a vehicle-body-side system. The tire-side device may be attached to a tire included in a vehicle. The vehicle-body-side system may be attached to a body of the vehicle. The tire-side device may output a detection signal corresponding to each of a plurality of types of detection targets. The tire-side device may perform processing of the detection signal and generate the data related to the detection target. The tire-side device may perform bidirectional communication with the vehicle-body-side system and transmit the data to the vehicle-body-side system. The vehicle-body-side system may perform bidirectional communication with the tire-side device and receive the data. The vehicle-body-side system may acquire the detection result for the detection target based on the data.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
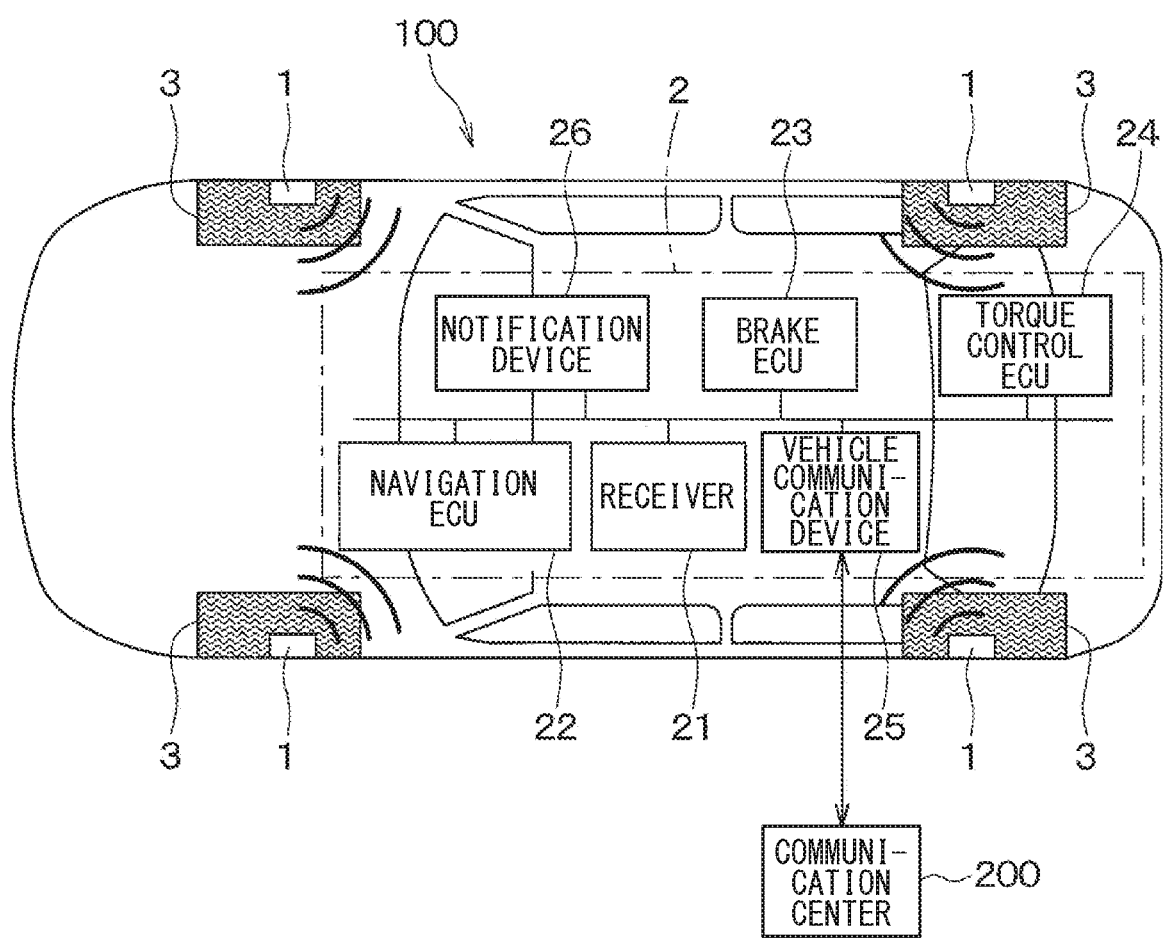
FIG. 1 is a diagram showing a block configuration of a tire system mounted in a vehicle in which a tire-side device according to a first embodiment is applied.

For example, a detection signal based on tire vibration, which is obtained by a vibration sensor unit such as an acceleration sensor included in a tire-side device, can be used to detect not only a road surface state but also various targets, such as a tire-related state or a physical amount. For example, the detection signal of the vibration sensor unit can be used to detect a tire wear state or a load applied to each wheel.

Although the detection signal based on the tire vibration which is obtained by the vibration sensor unit can be used to detect various targets, processing performed by the tire-side device differs according to the detection target and different detection procedures are to be performed. The method for processing the detection signal is different. For example, depending on the detection target, the required frequency band in the detection signal is different or various calculating methods including feature vector calculation are different. Therefore, the algorithm of a microcomputer of the tire-side device differs according to the detection target.

When the tire-side device includes a plurality of vibration sensor units and a plurality of microcomputers or a microcomputer with a high processing capability, detection can be made separately even for a plurality of targets.

When a plurality of vibration sensor units and microcomputers are provided or a large microcomputer is mounted, the weight and the physical size of the tire-side device increases and the power consumption of the tire-side device increases. Since the tire-side device is attached to a tire, an increase in the weight and the physical size is undesirable. Also, since the tire-side device is located in a physically remote place from the vehicle-body-side system, a decrease in the power consumption of the power source is required and an increase in the power consumption is undesirable. Particularly when a battery is used for the power source, the need for further decrease in power consumption is required because replacement of the battery is not easy.

The road surface state, wear state and the load applied to each wheel are exemplified as the plurality of types of detection targets which are used in the tire system. However, when a detection result is to be obtained as one of a plurality of types of detection targets related to the tire, the above difficulty may arise even with another detection target.

The present disclosure provides a tire system which reduces power consumption and suppresses increase in weight and physical size of a tire-side device.

An exemplary embodiment of the present disclosure provides a tire system that includes a tire-side device and a vehicle-body-side system. The tire-side device is attached to a tire of a vehicle and configured to transmit data related to a detection target among a plurality of types of detection targets related to the tire. The vehicle-body-side system is attached to a body of the vehicle and configured to receive the data and acquire a detection result for the detection target. The tire-side device includes a sensing unit, a signal processing unit, and a first data communication unit. The sensing unit is configured to output a detection signal corresponding to each of the plurality of types of detection targets. The signal processing unit is configured to perform processing of the detection signal and generate the data related to the detection target. The first data communication unit is configured to perform bidirectional communication with the vehicle-body-side system and transmit the data to the vehicle-body-side system. The vehicle-body-side system includes a second data communication unit and a control unit. The second data communication unit is configured to perform bidirectional communication with the tire-side device and receive the data. The control unit is configured to acquire the detection result for the detection target based on the data. The vehicle-body-side system transmits a request signal that requests which detection target is required among the plurality of types of detection targets to the tire-side device through the second data communication unit. The tire-side device generates, based on the request signal, the data related to the detection target indicated by the request signal and transmits the data to the vehicle-body-side system through the first data communication unit.

In the exemplary embodiment of the present disclosure, the vehicle-body-side system transmits the request signal to each tire-side device to notify the tire-side device of the required data. When processing the detection signal of the sensing unit, the algorithm for processing the detection signal is changed according to the request signal so that the plurality of detection targets can be dealt with. Therefore, it is unnecessary to provide a plurality of sensing units and a plurality of microcomputers for each tire-side device or provide a microcomputer with a high processing capability, so the increase in the weight and the physical size of the tire-side device can be suppressed and the power consumption can be reduced.

Hereinafter, some embodiments of the disclosure are described with reference to the accompanying drawings. In the following embodiments, the same or equivalent parts are designated by like reference signs for explanation.

First Embodiment

A tire system 100 with a road surface state determination function according to a first embodiment will be explained referring to FIG. 1 to FIG. 10. The tire system 100 according to this embodiment includes a tire-side device 1 and a vehicle-body-side system 2. The tire system 100 detects various states or physical amounts related to a tire 3 provided on each wheel of a vehicle, as a plurality of types of detection targets related to the tire 3, according to the vibration applied to a ground contact surface of the tire 3. In this case, the tire system 100 detects a road surface state of the traveling road surface and a wear state of the tire 3 as various states related to the tire 3 and detects a load applied to the wheel as a physical amount. Also, the tire system 100 warns about the hazard of the vehicle and controls the vehicle movement or notifies a communication center 200 of the road surface state of the traveling road surface on the basis of the state or the physical amount related to the tire 3.

Figure 2:
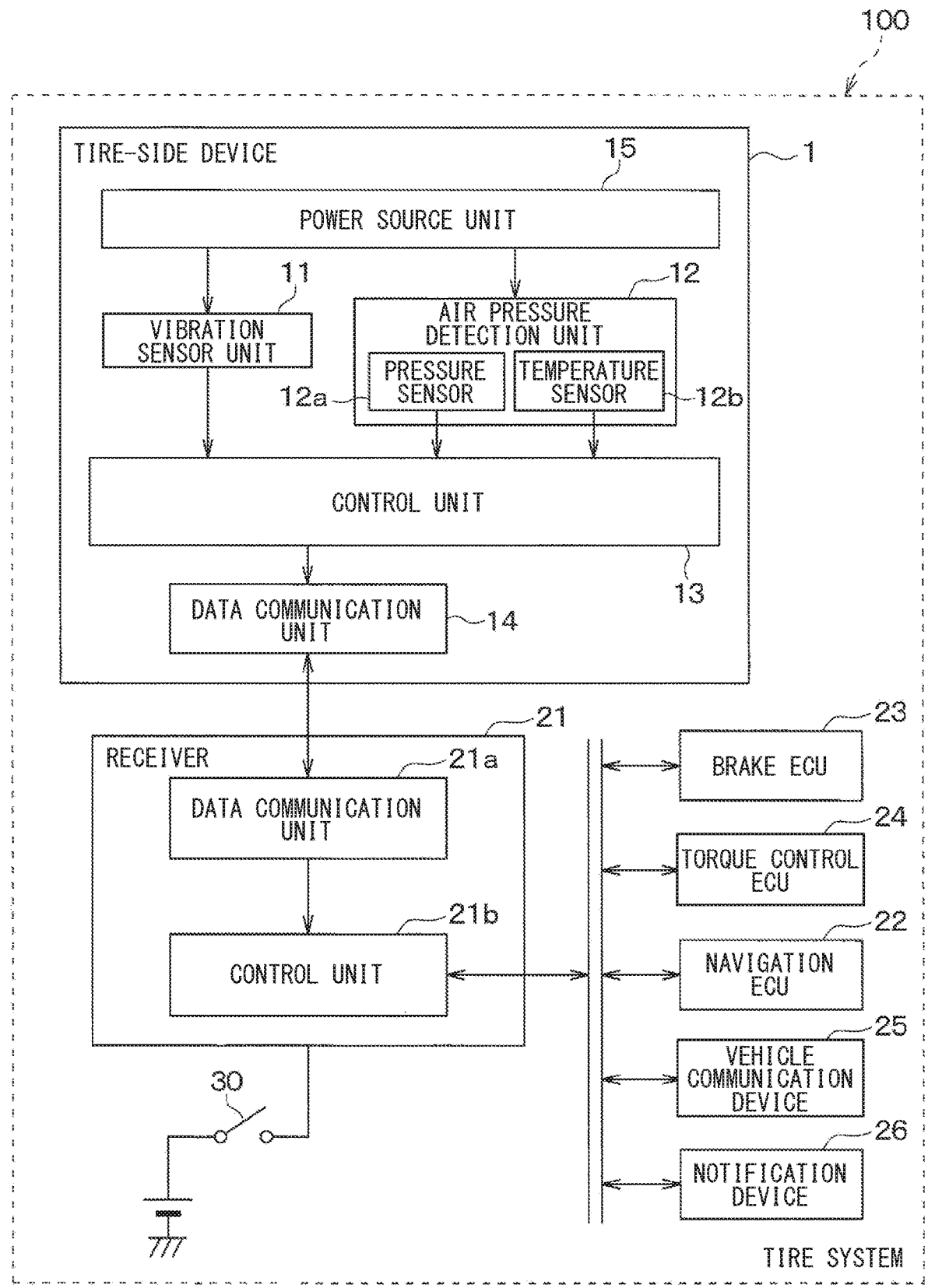
FIG. 2 is a block diagram showing details of configurations of the tire-side device and a vehicle-body-side system.

As shown in FIG. 1 and FIG. 2, the tire system 100 includes the tire-side device 1 provided on the wheel side and the vehicle-body-side system 2 including various units provided on the vehicle body side. The vehicle-body-side system 2 includes a receiver 21, an electronic control unit for navigation control (hereinafter referred to as the navigation ECU) 22, an electronic control unit for brake control (hereinafter referred to as the brake ECU) 23, an electronic control device for left/right drive torque control (hereinafter referred to as the torque control ECU) 24, a vehicle communication device 25, and a notification device 26 and the like. Next, the units which constitute the tire-side device 1 and the vehicle-body-side system 2 will be described in detail.

Figure 3:
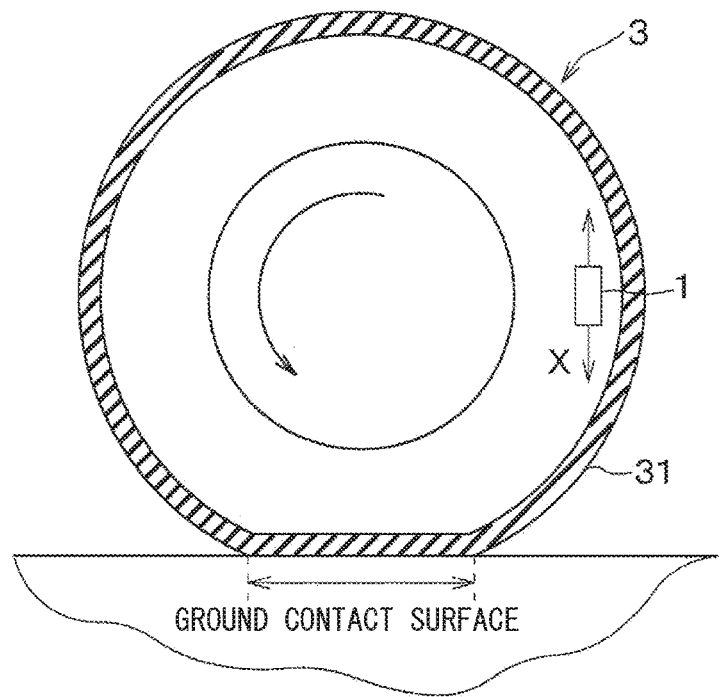
FIG. 3 is a sectional schematic diagram of a tire to which the tire-side device is attached.

As shown in FIG. 2, the tire-side device 1 includes a vibration sensor unit 11, an air pressure detection unit 12, a control unit 13, a data communication unit 14, and a power source unit 15 and attached, for example, to the back of the tread 31 of the tire 3 as shown in FIG. 3.

The vibration sensor unit 11 constitutes a vibration detection unit to detect the vibration applied to the tire 3. For example, the vibration sensor unit 11 is constituted by an acceleration sensor. In this case, for example, the vibration sensor unit 11 outputs an acceleration detection signal as a detection signal depending on the magnitude of vibration in the direction tangent to the circular orbit drawn by the tire-side device 1 with rotation of the tire 3, namely in the tire tangential direction indicated by arrow X in FIG. 3. More specifically, the vibration sensor unit 11 generates, as a detection signal, an output voltage, etc. which is positive in one of the two directions indicated by arrow X and negative in the opposite direction. For example, the vibration sensor unit 11 detects the acceleration in every predetermined sampling cycle which is set as a cycle shorter than one rotation of the tire 3 and outputs it as a detection signal. The detection signal of the vibration sensor unit 11 is expressed as an output voltage or output current. Here, the case that the detection signal is expressed as an output voltage is given as an example.

The air pressure detection unit 12 includes a pressure sensor 12a and a temperature sensor 12b. The pressure sensor 12a outputs a detection signal which indicates a tire air pressure and the temperature sensor 12b outputs a detection signal which indicates a tire inner temperature. The data on the tire air pressure and temperature indicated by the detection signals of the pressure sensor 12a and temperature sensor 12b is used as tire air pressure data. In this embodiment, the data on the tire air pressure and temperature indicated by the detection signals of the pressure sensor 12a and temperature sensor 12b is entered into the control unit 13 and the control unit 13 calculates the tire air pressure at a reference temperature. Specifically, since the tire air pressure indicated by the detection signal of the pressure sensor 12a is equivalent to the actual measured value of tire air pressure, the actual measured value of tire air pressure is corrected according to the temperature indicated by the detection signal of the temperature sensor 12b so that the tire air pressure at the reference temperature is calculated.

The control unit 13 is a unit which corresponds to a signal processing unit for generating data related to the detection target and is constituted by a known microcomputer including a CPU, ROM, RAM, and I/O to perform various types of processing according to the program stored in the ROM or the like. For example, the control unit 13 switches between the start state and sleep state of each of the functions of the control unit 13 according to a detection signal of the vibration sensor unit 11 and, in the start state, starts each function according to the power supply from the power source unit 15. The control unit 13 receives a detection signal from the vibration sensor unit 11 and, for example, on the basis that the waveform of the detection signal exceeds a predetermined threshold, detects the rotation of the tire 3, namely traveling of the vehicle. Upon detection of traveling of the vehicle, the control unit 13 switches each function in the sleep state to the start state. Then, the control unit 13 uses the detection signal of the vibration sensor unit 11 as a detection signal representing vibration data in the tire tangential direction, obtains road surface data and load data and further wear state data by processing the signal, and performs processing to transmit the data to the data communication unit 14. In addition, the control unit 13 obtains tire air pressure data on the basis of the data transmitted from the air pressure detection unit 12 and performs processing to transmit the data to the data communication unit 14.

Specifically, the control unit 13 extracts the feature amount of tire vibration by performing the waveform processing of the vibration waveform indicated by the detection signal using the detection signal of the vibration sensor unit 11 as a detection signal representing vibration data in the tire tangential direction. In the case of this embodiment, by processing the detection signal of the acceleration of the tire 3 (hereinafter referred to as "tire G"), the feature amount of tire G is extracted. The control unit 13 transmits the data including the extracted feature amount as road surface data on the road surface state to the data communication unit 14.

The feature amount is an amount which represents the feature of the vibration applied to the tire 3 and obtained by the vibration sensor unit 11 and, for example, expressed by a feature vector.

Figure 4:
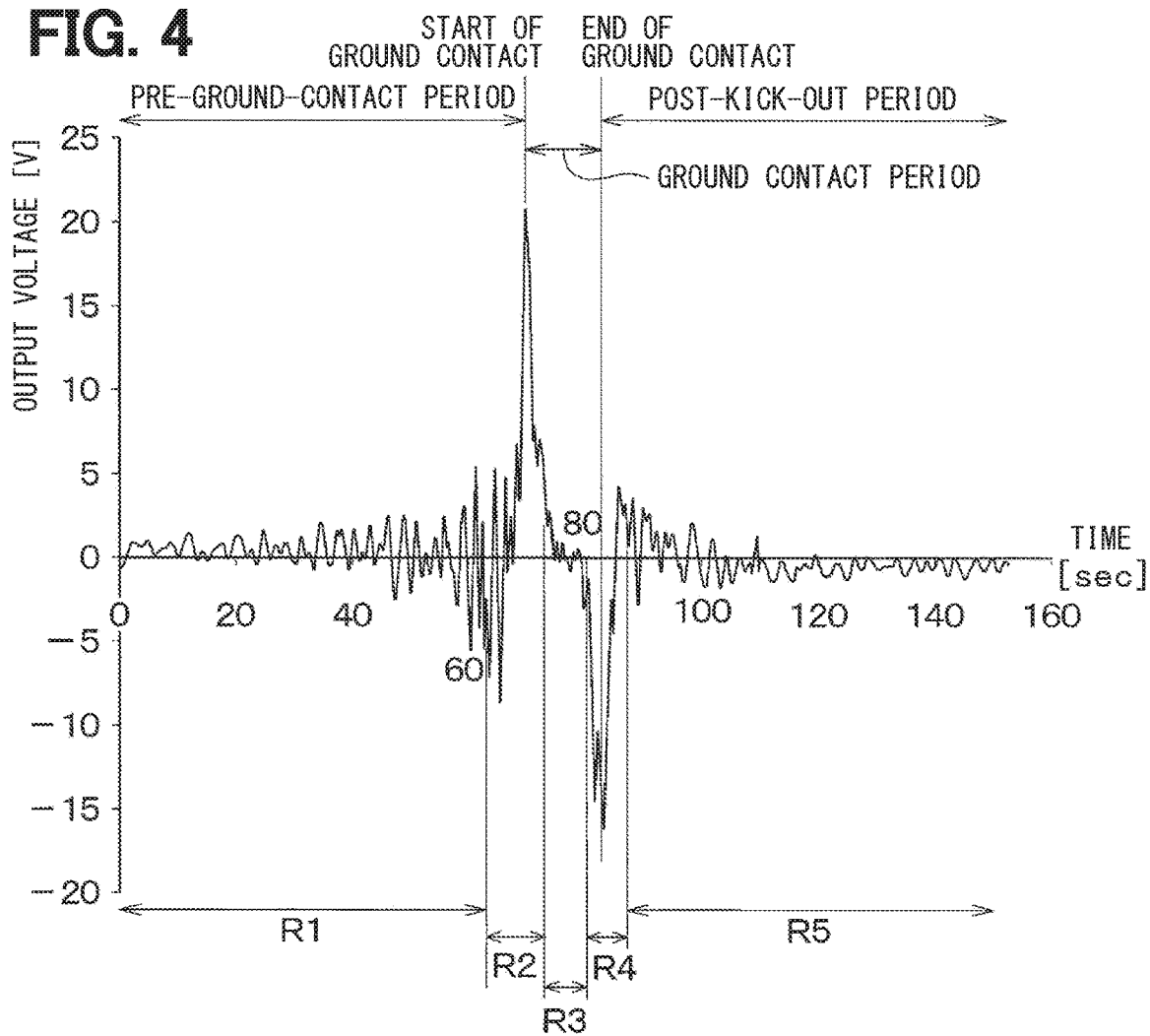
FIG. 4 is a diagram illustrating an output voltage waveform from an acceleration acquisition unit during tire rotation.

The output voltage waveform of the detection signal of the vibration sensor unit 11 during tire rotation is, for example, a waveform as shown in FIG. 4. As shown in the figure, as the tire 3 rotates, the output voltage of the vibration sensor unit 11 has a maximum value at the ground contact start time when the portion of the tread 31 corresponding to the location of the vibration sensor unit 11 starts contacting the ground. Hereinafter, the peak value at the ground contact start time when the output voltage of the vibration sensor unit 11 has the maximum value is referred to as a first peak value. Furthermore, as shown in FIG. 4, as the tire 3 rotates, the output voltage of the vibration sensor unit 11 has a minimum value at the ground contact end time when the portion of the tread 31 corresponding to the location of the vibration sensor unit 11 changes from the ground contact state to the non-contact state. Hereinafter, the peak value at the ground contact end time when the output voltage of the vibration sensor unit 11 has the minimum value is referred to as a second peak value.

The reason that the output voltage of the vibration sensor unit 11 has the peak values at the above time points is as follows. When the portion of the tread 31 corresponding to the location of the vibration sensor unit 11 contacts the ground with rotation of the tire 3, the portion of the tire 3 which has been a roughly cylindrical surface is pressed in the vicinity of the vibration sensor unit 11 to become flat. As the impact at this time is received, the output voltage of the vibration sensor unit 11 has the first peak value. When the portion of the tread 31 corresponding to the location of the vibration sensor unit 11 leaves the ground with rotation of the tire 3, the tire 3 is released from the pressure in the vicinity of the vibration sensor unit 11 and restored from the flat shape to the roughly cylindrical shape. As the impact at the time of restoration of the tire 3 to the original shape is received, the output voltage of the vibration sensor unit 11 has the second peak value. For this reason, the output voltage of the vibration sensor unit 11 has the first peak value and the second peak value at the ground contact start time and the ground contact end time, respectively. The direction of impact at the time of pressure application to the tire 3 and the direction of impact at the time of release from the pressure are opposite and thus the signs of the output voltages are opposite.

Here, the moment the portion of the tire tread 31 corresponding to the location of the vibration sensor unit 11 contacts the road surface is referred to as the "tread-in period" and the moment it leaves the road surface is referred to as the "kick-out period". The "tread-in period" includes the time point at which the first peak value is reached and the "kick-out period" includes the time point at which the second peak value is reached. The period before the tread-in period is referred to as the "pre-tread-in period" and the period from the tread-in period to the kick-out period, namely the period in which the portion of the tire tread 31 corresponding to the location of the vibration sensor unit 11 is contacting the ground is referred to as the "pre-kick-out period" and the period after the kick-out period is referred to as the "post-kick-out period". Thus, the period in which the portion of the tire tread 31 corresponding to the location of the vibration sensor unit 11 contacts the ground and the periods before and after it can be divided into five periods. In FIG. 4, in the detection signal, the "pre-tread-in period" "tread-in period", "pre-kick-out period", "kick-out period" and "post-kick-out period" are designated as five periods R1 to R5 respectively.

Since the vibration generated in the tire 3 in each period varies according to the road surface state and the detection signal of the vibration sensor unit 11 changes, the road surface state of the road surface on which the vehicle travels is detected by frequency analysis of the detection signal of the vibration sensor unit 11 in each period. For example, on a slippery road surface state like a thick snow road, the shear force at the kick-out time decreases and the band value selected from the band of 1 kHz to 4 kHz is small in the kick-out period R4 and the post-kick-out period R5. Since each frequency component of the detection signal of the vibration sensor unit 11 changes depending on the road surface state in this way, the road surface state can be determined on the basis of frequency analysis of the detection signal.

Figure 5:
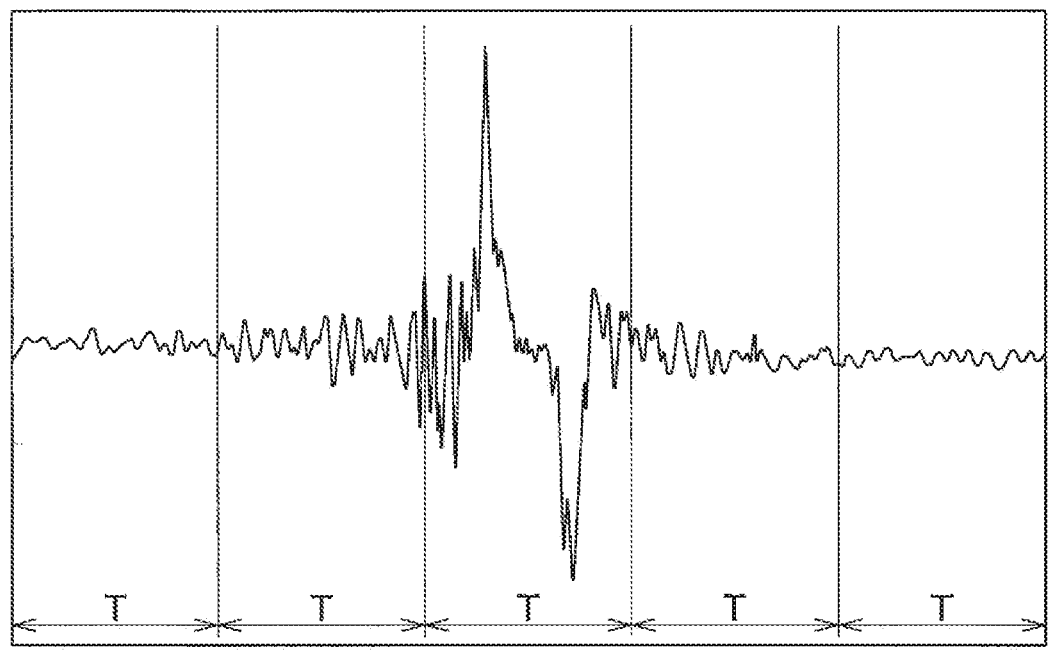
FIG. 5 is a diagram illustrating a detection signal from the acceleration acquisition unit, which is segmented by each of time windows having a predetermined time width T.

Therefore, the control unit 13 divides the detection signal of the vibration sensor unit 11 for one rotation of the tire 3 as expressed by a continuous time axis waveform, into a plurality of areas, each corresponding to a time window with predetermined time width T as shown in FIG. 5 and extracts the feature amount by making frequency analysis in each area. Specifically, by making frequency analysis in each area, the power spectral value in each frequency band, namely the vibration level in a specific frequency band is calculated and the power spectral value is taken as the feature amount.

The control unit 13 also extracts the ground contact area for the vibration sensor unit 11 during rotation of the tire 3 according to temporal change in the output voltage of the vibration sensor unit 11. The ground contact area here means the area in which the portion of the tread 31 of the tire 3 corresponding to the location of the vibration sensor unit 11 contacts the road surface. In the case of this embodiment, the location of the vibration sensor unit 11 is the location of the tire-side device 1, so the ground contact area is the same in meaning as the area in which the portion of the tread 31 of the tire 3 corresponding to the location of the tire-side device 1 contacts the road surface. Since one ground contact area is generated every one rotation of the tire 3, the number of rotations of the tire 3 per unit time, namely the rotation speed can be calculated from the time interval between ground contact areas or the like.

Based on the above, the control unit 13 transmits the data on the extracted ground contact area and the data on the rotation speed of the tire 3 to the data communication unit 14, as load data or wear state data.

The control unit 13 also calculates the tire air pressure under the reference temperature according to the detection signal indicating the tire air pressure as transmitted from the air pressure detection unit 12 or the detection signal indicating the tire inner temperature, and performs the function to transmit it as tire air pressure data to the data communication unit 14.

The control unit 13 also controls data transmission from the data communication unit 14 and transmits the road surface data to the data communication unit 14 at the desired time point for data transmission so that the data communication unit 14 makes data communication.

For example, the control unit 13 extracts the feature amount of tire G every one rotation of the tire 3 and transmits the road surface data to the data communication unit 14 once or several times every one rotation or every several rotations of the tire 3. For example, the control unit 13 transmits the road surface data including the feature amount of tire G extracted during one rotation of the tire 3 at the time of transmitting the road surface data to the data communication unit 14.

Furthermore, the control unit 13 transmits wear state data to the data communication unit 14, for example, once in a predetermined time period after the start of travel of the vehicle so that the wear state can be calculated once during one travel. When a request is sent from the torque control ECU 24 which will be described later, the control unit 13 transmits load data to the data communication unit 14. Also, the control unit 13 transmits tire air pressure data to the data communication unit 14 in every predetermined periodic transmission cycle. Since the tire air pressure can be used for correction in calculation of the wear state and load, the control unit 13 also transmits the tire air pressure data when transmitting the wear state data and load data to the data communication unit 14.

Here, the control unit 13 generates the road surface data, load data and wear state data among the data explained here, according to the detection signal of the vibration sensor unit 11. However, since the detection targets are different, in order to generate various data, the control unit 13 performs different types of waveform processing for the detection signal of the vibration sensor unit 11, namely processing using different algorithms.

Specifically, different types of processing are performed to obtain the feature amount of tire G for road surface data, obtain the ground contact area and the rotation speed of the tire 3 for load data, and obtain the rotation speed of the tire 3 for wear state data. For example, in order to obtain the feature amount of tire G, the frequency components of 0 kHz to 5 kHz in the detection signal of the vibration sensor unit 11 are extracted using five band filters, each for 1 kHz band, to obtain the power spectral value in each frequency band. In order to obtain the ground contact area and the rotation speed of the tire 3, it is necessary that waveform processing which allows recognition of the maximum value and minimum value of the detection signal of the vibration sensor unit 11 can be performed and the power spectral value for a specific frequency band is not required. Therefore, processing by the algorithm which differs depending on the required data is performed.

Therefore, as will be explained later, in the tire system 100 according to this embodiment, which data is required can be grasped from a request signal from the vehicle-body-side system 2 and the detection target is grasped according to the request signal and the algorithm is changed depending on the detection target.

The data communication unit 14 is a unit equivalent to a first data communication unit which makes bidirectional communication with the vehicle-body-side system 2. Regarding the bidirectional communication protocol, various protocols can be applied: Bluetooth communication including BLE (abbreviation for Bluetooth Low Energy), wireless LAN (abbreviation for Local Area Network) such as wifi, Sub-GHz communication, ultrawide band communication, ZigBee and the like can be applied. "Bluetooth" is a registered trademark.

When various data such as road surface data is transmitted from the control unit 13, the data communication unit 14 performs data transmission at that time point. The time point of data transmission from the data communication unit 14 is controlled by the control unit 13. For example, in the case of road surface data, each time data is transmitted every one rotation or every several rotations of the tire 3 from the control unit 13, the data is transmitted from the data communication unit 14.

The power source unit 15 serves as the power source for the tire-side device 1 and supplies electric power to various units of the tire-side device 1 to enable the various units to operate. The power source unit 15 is constituted, for example, by a battery such as a button battery. Since the tire-side device 1 is located inside the tire 3, the battery cannot be replaced easily and thus it is necessary to reduce power consumption. Not only a battery but also a power generating unit, accumulator or the like can constitute the power source unit 15. When the power source unit 15 has a power generating unit, the difficulty about battery life is less important than in the case of a battery, but since it is difficult to generate large power, the issue of reduction in power consumption is the same as in the case of a battery.

Meanwhile, the receiver 21 receives various data such as the road surface data transmitted from the tire-side device 1 and detects the road surface state and wear state or detects the load applied to each wheel. The receiver 21 also performs processing to output road surface data to the vehicle communication device 25. As the road surface data at this time, the road surface data sent from each tire-side device 1 may be directly used or the road surface data indicating the detection result of the road surface state detected by the receiver 21 may be used as will be described later. Then, based on this configuration, the road surface data is sent from the vehicle communication device 25 to the communication center 200 which collects road information, etc. The receiver 21 also performs processing to obtain more accurate road surface data from the communication center 200 through the vehicle communication device 25.

Specifically, the receiver 21 includes a data communication unit 21*a* and a control unit 21*b*.

The data communication unit 21a is a unit which constitutes a second data communication unit and performs the function to receive various data sent from the data communication unit 14 of the tire-side device 1 and transmit the data to the control unit 21b. The data communication unit 21a also performs the function to send a request signal, etc. transmitted from the control unit 21b to each tire-side device 1.

The control unit 21b is constituted by a known microcomputer which includes a CPU, ROM, RAM, I/O and the like and performs various types of processing according to the program stored in the ROM or the like.

Specifically, the control unit 21b stores a support vector for each road surface type and detects the road surface state on the basis of the support vector and the feature amount included in the road surface data. The support vector is a feature amount as a model and obtained, for example, by learning using a support vector machine. The vehicle provided with the tire-side device 1 is made to travel on each type of road surface experimentally and the feature amounts extracted from the detection signals of the vibration sensor unit 11 are learned for a predetermined number of tire rotations and the typical feature amounts extracted among them for a predetermined number of rotations are taken as a support vector. For example, the feature amounts for one million rotations are learned for each road surface type and the typical feature amounts extracted among them for one hundred rotations are taken as a support vector. The degree of similarity between the support vector and the feature amount included in the road surface data is determined and the type of road surface to which the support vector with a high degree of similarity belongs is taken as the road surface state of the road surface on which the vehicle travels. The methods for calculating the feature amount and the degree of similarity are omitted here and various methods in the public domain can be adopted.

In addition, the control unit 21b transmits the detection result of the road surface state or the road surface data to the vehicle communication device 25 in order to transmit it to the communication center 200, or receives the accurate road surface data transmitted from the communication center 200 to the vehicle communication device 25 to obtain the road surface state.

In addition, the control unit 21b detects the load applied to each wheel to which the tire 3 is attached, tire air pressure and the wear state of the tire 3 on the basis of the load data, tire air pressure data and wear state data for each tire-side device 1. In the case of this embodiment, the above road surface data and tire air pressure data are sent from the tire-side device 1 at a predetermined time point and the load data and wear state data are sent according to a request signal from the control unit 21b. The load data is requested by sending a request signal from the control unit 21b to the tire-side device 1 when a request signal is transmitted from the brake ECU 23 or torque control ECU 24 to the control unit 21b, as will be explained later. The wear state data is requested by sending a request signal from the control unit 21b to the tire-side device 1 so that the wear state can be detected at least once during one travel. In this case, a request signal for wear state data is sent from the control unit 21b to the tire-side device 1 once within a predetermined time period after an ignition switch (hereinafter referred to as IG) 30 equivalent to a start switch to enable the vehicle to travel is turned on. The wear state is detected at least once during one travel. By limiting the number of times of detection to one, the processing burden on the tire-side device 1 can be reduced and also the power required for processing and data transmission can be reduced.

The load can be calculated from the area ratio of the ground contact areas of the four wheels by calculating the ground contact area on the basis of the time required for one tire rotation which is obtained from the ground contact area time included in the load data and the data on the rotation speed of the tire 3. When the tire size or tire air pressure is different among the wheels, by making a correction according to these, the load applied to each wheel can be obtained more accurately.

The tire air pressure can be obtained as a tire air pressure under the reference temperature when the tire air pressure data is transmitted from the tire-side device 1. In this case, the result of calculation of tire air pressure under the reference temperature in the tire-side device 1 is transmitted as tire air pressure data. Alternatively, the actual measured value of tire air pressure and the tire inner temperature data may be transmitted. In this case, the control unit 21b will calculate the tire air pressure under the reference temperature according to those data.

The wear state can be calculated from the vehicle travel distance information transmitted from the navigation ECU 22 and the data on the rotation speed of the tire 3 included in the wear state data as will be described later. In other words, as the depth of grooves made in the tread 31 of the tire 3 changes, the circumference of the tire 3 decreases, so even when the travel distance is the same, the number of rotations of the tire 3 is larger after the wear of the tire 3 than before the wear. Therefore, the wear state of the tire 3 can be calculated from the difference between the vehicle travel distance obtained by information from the navigation ECU 22 and the vehicle travel distance estimated from the rotation speed of the tire 3 included in the wear state data and the tire radius. Furthermore, as the vehicle travels, the tire 3 is deformed due to the load applied to each wheel and the tire 3 is also deformed according to the tire air pressure. Therefore, the wear state can be calculated more accurately by correcting the rotation speed of each tire 3 or the vehicle travel distance estimated from the rotation speed according to the load applied to each wheel as calculated as mentioned above and the tire air pressure.

The detailed methods for calculating the load applied to each wheel, tire air pressure and the wear state of the tire 3 are already in the public domain and description thereof is omitted here. Various methods in the public domain can be adopted.

The control unit 21b transmits the detection result of the road surface state or the road surface state transmitted from the communication center 200 to the notification device 26 as necessary and the notification device 26 notifies the driver of the road surface state. Consequently, the driver will try to drive in a suitable manner for the road surface state and can avoid the hazard of the vehicle. For example, the road surface state may be always displayed through the notification device 26 or the road surface state may be displayed to give a warning to the driver when the road surface state requires more careful driving, for example, when the road surface state is a wet road, frozen road or low p road. Similarly, the control unit 21b transmits the detection result of the wear state and the detection result of tire air pressure to the notification device 26 and notifies the driver of the detection results through the notification device 26. Consequently, the driver can know the time to replace the tire or the time to adjust the tire air pressure.

Furthermore, the control unit 21b transmits the road surface state and the load on each wheel to the ECUs for performing vehicle movement control, such as the brake ECU 23 and torque control ECU 24. The vehicle movement control is performed according to the transmitted road surface state and load on each wheel.

The navigation ECU 22 is included in a navigation system and acquires information from a non-transitory tangible storage medium such as a memory storing road information and measures the present position of the vehicle on the basis of the position information from the GPS (aberration for Global Positioning System) satellite. In other words, the navigation ECU 22 performs various types of processing concerning route guidance and the like. The tire system 100 in this embodiment uses the road information, present position information and vehicle travel distance information which are handled by the navigation ECU 22, and the navigation ECU 22 constitutes a position information acquisition unit.

Specifically, the road information and present position information are used, for example, to indicate the relation of the road on which the vehicle is currently traveling and the present position with the road surface data and are transmitted from the navigation ECU 22 to the receiver 21. The above information is transmitted through the control unit 21*b* or directly from the navigation ECU 22 to the vehicle communication device 25 and when the road surface data is sent from the vehicle communication device 25 to the communication center 200, the information is sent in association with the road surface data. This enables the communication center 200 to grasp which place corresponds to the road surface state indicated by the road surface data. The vehicle travel distance information is transmitted to the control unit 21*b*. The control unit 21*b* detects the wear state of the tire 3 on the basis of the vehicle travel distance information.

The brake ECU 23 constitutes a braking control device which performs various types of brake control and drives the actuator for brake fluid pressure control to generate a brake fluid pressure automatically and pressurizes the wheel cylinder to generate a braking force. The brake ECU 23 can also control the braking force for each wheel independently.

As mentioned above, the road surface state and the load detection result are transmitted from the control unit 21*b* to the brake ECU 23. Based on the road surface state and the load detection result, the brake ECU 23 performs brake control according to the road surface state and load by adjusting the braking force according to the road surface state and controlling the braking force for each wheel according to the load on each wheel. When performing brake control according to the load, the brake ECU 23 requires the load data and thus outputs a request signal for the load data to the control unit 21*b*. Based on this configuration, the control unit 21*b* transmits a request signal for the load data to the tire-side device 1 through the data communication unit 21*a*. The brake ECU 23 calculates the vehicle speed according to a detection signal of a wheel speed sensor (not shown) and transmits the calculation result to the receiver 21 as vehicle speed information.

The torque control ECU 24 controls the drive torque and performs control to move the drive forces of left and right wheels actively, for example, as in torque vectoring differential control. The torque control ECU 24 moves the drive forces of left and right wheels depending on the load on the basis of the load detection result transmitted from the control unit 21*b* to achieve torque distribution which depends on the load on each wheel. When performing torque control depending on the load, the torque control ECU 24 requires the load data and thus outputs a request signal for load data to the control unit 21*b*. Based on this configuration, the control unit 21*b* transmits the request signal for the load data to the tire-side device 1 through the data communication unit 21*a*.

The vehicle communication device 25 can make road-to-vehicle communication and exchanges information with the communication center 200, for example, through a communication system (not shown) installed on the road, etc. In the case of this embodiment, the vehicle communication device 25 performs the function to send the road surface data transmitted from the receiver 21 to the communication center 200 and receive more accurate road surface data from the communication center 200.

The notification device 26 is constituted, for example, by a meter indicator and used to notify the driver that the road surface state requires the driver to drive more carefully or of the decline in tire air pressure or the wear state of the tire 3. When the notification device 26 is constituted by a meter indicator, it is located in a place to enable the driver to recognize it visually while driving the vehicle. For example, the notification device 26 is installed inside the instrument panel of the vehicle. Upon receiving the data indicating the road surface state and tire air pressure or wear state from the receiver 21, the meter indicator displays it in a manner that its content can be grasped, thereby giving a warning to the driver visually.

The notification device 26 may be constituted by a buzzer or vocal guidance device. When that is the case, the notification device 26 can notify the driver of the road surface state and tire air pressure or wear state in an auditory manner by buzzer sound or vocal guidance. Although a meter indicator has been described as an example of the notification device 26 which gives a visual warning, instead the notification device 26 may be constituted by an indicator which displays information, like a head up display.

The tire system 100 according to this embodiment is configured as mentioned above. The various units which constitute the vehicle-body-side system 2 are connected by an in-vehicle LAN (Local Area Network) such as CAN (Controller Area Network) communication. Therefore, the various units can communicate information with each other through the in-vehicle LAN.

Meanwhile, the communication center 200, which exchanges the information on road surface data with the tire system 100, does the business of collecting road information and providing road information to vehicles, etc. Although the communication center 200 and the vehicle communication device 25 may be able to communicate with each other directly, the communication center 200 can communicate with the vehicle communication device 25 through communication systems installed at various spots on the road, etc.

In the case of this embodiment, the communication center 200 manages the information on the road surface state of each place on each road in map data as a database and maps the ever-changing road surface state on the basis of the received road surface data. In short, the communication center 200 updates the information on the road surface state of each place on each road in the map data on the basis of the received road surface data. Then, the communication center 200 provides the road surface data from the database to vehicles.

Specifically, the communication center 200 collects the road surface data of the road on which a vehicle has traveled, which is sent from the vehicle and, on the basis of the road surface data, updates the road surface data of each road in the map data. The communication center 200 also collects weather information, etc. and corrects the road surface data on the basis of the weather information, etc. to update the road surface data as more accurate road surface data. For example, the communication center 200 acquires information on the amount of snowfall or a frozen road surface as weather information and for a snow-covered road surface or frozen road surface, performs updating to road surface data depending on a snow-covered road surface or frozen road surface, so that more accurate road surface data is stored sequentially. By providing the road surface data stored in the database to the vehicle, the communication center 200 transmits more accurate road surface data to the vehicle. At this time, the communication center 200 collects road surface data from many vehicles and updates the road surface data of each road in the map data stored in the database, so each vehicle can obtain not only the road surface data for the present position but also the road surface data for the road on which the vehicle is going to travel.

Next, operation of the tire system 100 according to this embodiment will be explained referring to the flowcharts shown in FIG. 6 to FIG. 10.

Figure 6:
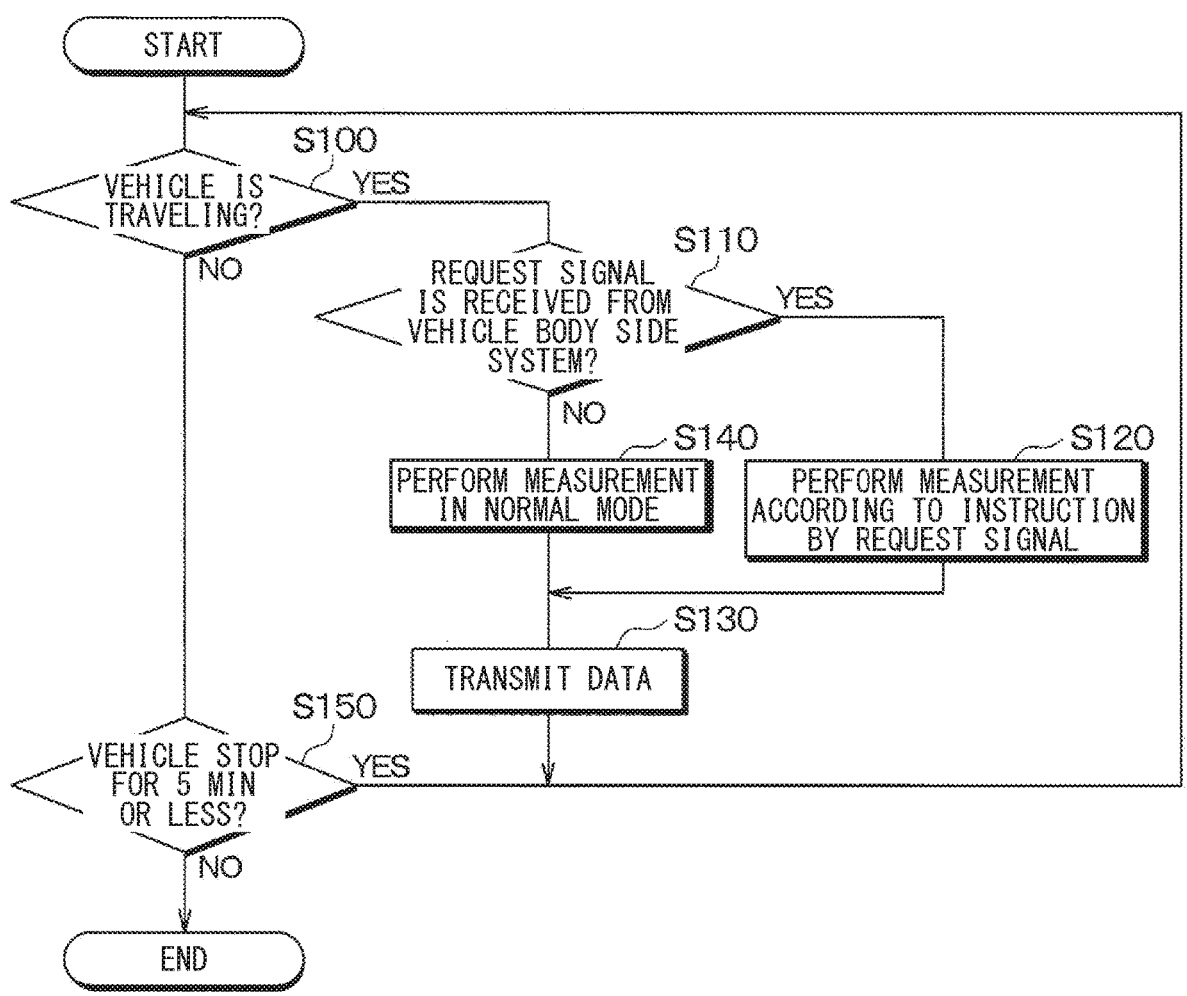
FIG. 6 is a flowchart of the tire-side process which the tire-side device performs.

First, the tire-side process which each tire-side device 1 performs will be explained referring to FIG. 6. This process is performed when the waveform of a detection signal of the vibration sensor unit 11 exceeds a predetermined threshold and the control unit 13 enters the start state. The process is performed by the control unit 13 in every predetermined control cycle.

First, when the control unit 13 is switched to the start state, at S100 it determines whether the vehicle is traveling or not, namely traveling or parking. This process is performed, for example, according to a detection signal of the vibration sensor unit 11. Specifically, when the output voltage waveform of the detection signal of the vibration sensor unit 11 represents a waveform for one tire rotation, it is determined that the vehicle is traveling. The determination that the tire 3 has made one rotation is made on the basis of the time axis waveform of the detection signal of the vibration sensor unit 11. Specifically, since the detection signal has a time axis waveform as shown in FIG. 4, one rotation of the tire 3 can be grasped by confirming the first peak value and second peak value of the detection signal. Since rotation of the tire 3 is the same in meaning as traveling of the vehicle, whether the vehicle is traveling or stopped can be detected according to rotation of the tire 3.

When an affirmative determination is made here, the process proceeds to S110 and the control unit 13 determines whether or not a request signal is received from the vehicle-body-side system 2. As mentioned above, upon receiving a request signal for load data from the brake ECU 23 or torque control ECU 24, the control unit 21b sends the data to the tire-side device 1. Also, the control unit 21b sends a request signal for wear state data to the tire-side device 1 once within the predetermined time period after IG is turned on. When the request signal is received by the tire-side device 1, an affirmative determination is made at S110.

Then, when an affirmative determination is made at S110, the process proceeds to S120 and the control unit 13 makes measurement according to the instruction by the request signal. Specifically, when the received request signal is a request signal for load data, the control unit 13 measures the ground contact area and the rotation speed of the tire 3 according to the detection signal of the vibration sensor unit 11 and generates load data including the data. When the received request signal is a request signal for wear state data, the control unit 13 calculates the rotation speed of the tire 3 and generates wear state data including the data. As wear state data, tire air pressure data or load data may be generated as necessary.

After that, the process proceeds to S130 and the control unit 13 performs the data transmission step to send the data generated at S120 to the tire-side device 1 and repeats the steps from S100.

Meanwhile, when a negative determination is made at S110, the process proceeds to S140 and the control unit 13 makes measurement in the normal mode. Specifically, the feature amount of tire G is extracted by performing waveform processing of the vibration waveform indicated by the detection signal of the vibration sensor unit 11 and road surface data including the extracted feature amount is generated. This process may be performed every one rotation of the tire 3 or every several rotations. In addition, the tire air pressure under the reference temperature is calculated according to the detection signal of the pressure sensor 12a of the air pressure detection unit 12 or the temperature sensor 12b, and tire air pressure data including the data is generated.

After that, the process proceeds to S130 and the control unit 13 performs data transmission to send the road surface data or tire air pressure data and repeats the processes from S100.

When the vehicle stops, a negative determination is made at S100 and thus the control unit 13 proceeds to S150. At S150, the control unit 13 determines whether or not the duration after stop of the vehicle is within a predetermined time period, for example, 5 minutes. For example, the control unit 13 counts the elapsed time during which negative determinations have been made continuously after the first negative determination at S100 and determines whether or not the elapsed time is within the predetermined time period. In other words, since the tire-side device 1 cannot grasp that IG is on or off, when the duration after stop of the vehicle has reached the predetermined time period, the control unit 13 determines that IG is turned off.

When the predetermined time has elapsed after stop of the vehicle, a negative determination is made at S150 and thus the control unit 13 is switched to the sleep state to end the process. After that, the control unit 13 keeps the sleep state, for example, until the vehicle starts traveling again and changes to the start state according to the detection signal of the vibration sensor unit 11. The tire-side process is ended in this way.

Figure 7:
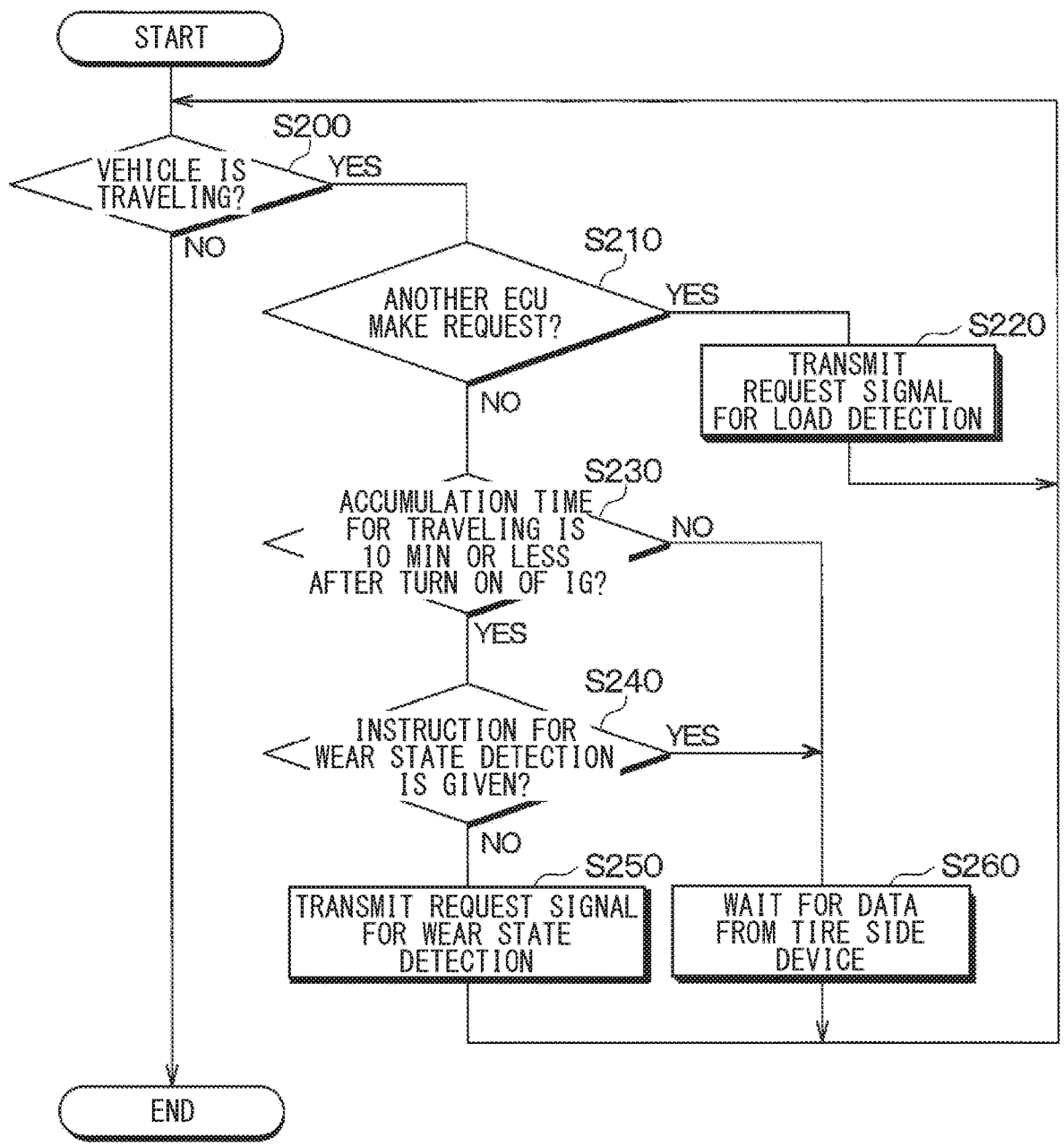
FIG. 7 is a flowchart showing a vehicle-body-side process performed by a control unit of the vehicle-body-side system.
Figure 8:
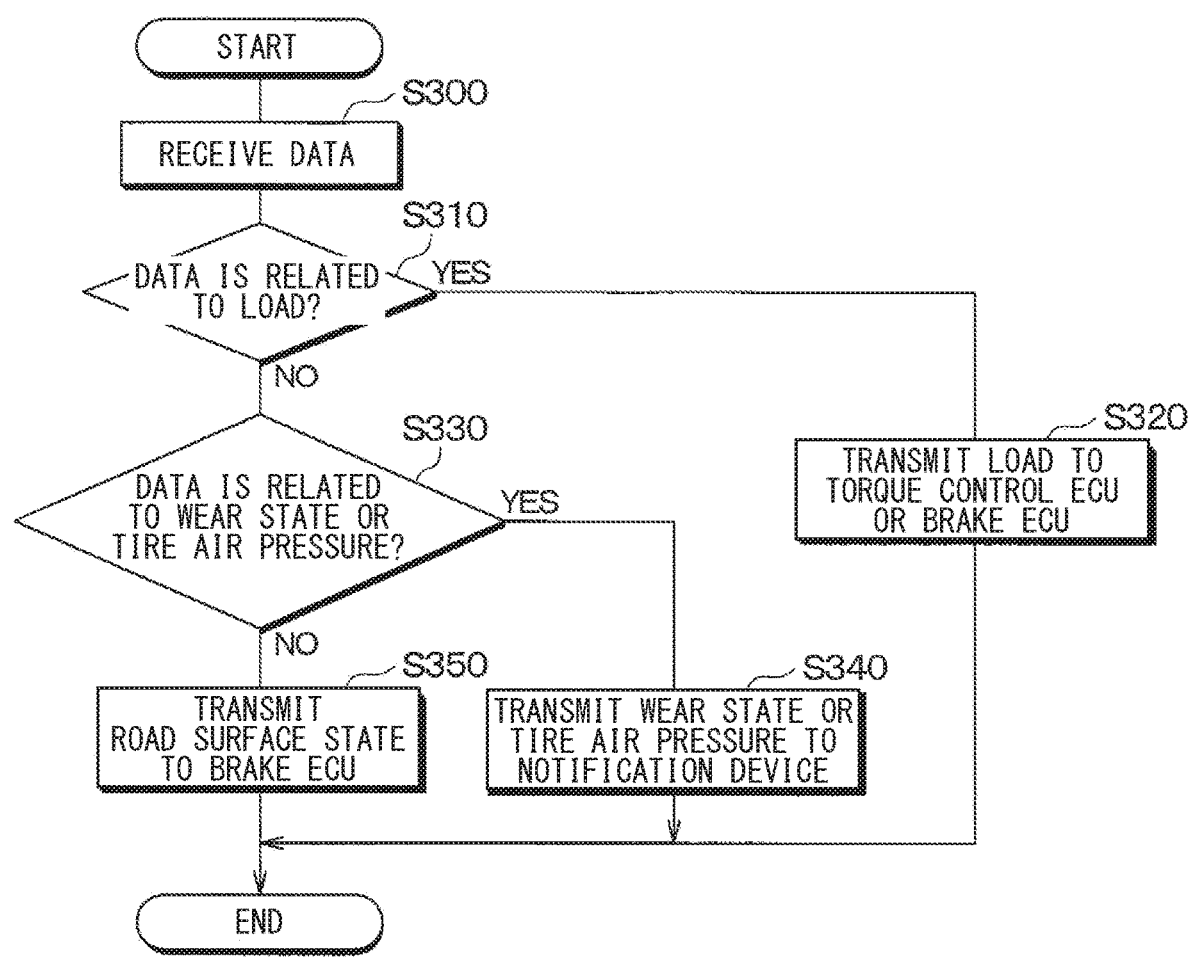
FIG. 8 is a flowchart showing details of a data waiting process by the vehicle-body-side process.

Next, the vehicle-body-side process performed by the control unit 21b of the receiver 21 in the vehicle-body-side system 2 will be explained, referring to FIG. 7. This process is performed in every predetermined control cycle after the IG switch 30 is turned on and the power to the control unit 21b is turned on.

First, at S200 the control unit 21b determines whether or not the vehicle is traveling. This process is performed, for example, on the basis of the vehicle speed information transmitted from the brake ECU 23. When the vehicle speed is no longer 0, the control unit 21b determines that the vehicle is traveling. When an affirmative determination is made here, the process proceeds to S210. When a negative determination is made, the process is ended.

At S210, the control unit 21b determines whether or not a request is made from another ECU. As mentioned above, the brake ECU 23 or torque control ECU 24 outputs a request signal for load data when performing brake control or torque control depending on load. Upon receiving the request signal for load data, the control unit 21b makes an affirmative determination at S210. When an affirmative determination is made here, the process proceeds to S220 and the control unit 21*b* sends a request signal for load data to the tire-side device 1. When a negative determination is made here, the process proceeds to S230.

At S230, the control unit 21*b* determines whether or not an accumulation time for traveling after the IG switch 30 is turned on is equal to or less than 10 minutes. When an affirmative determination is made here, the process proceeds to S240 and the control unit 21*b* determines whether or not an instruction to detect the wear state has been given, namely a request signal for wear state data has been sent. Since the wear of the tire 3 does not progress rapidly, it is considered as sufficient that the wear state can be detected at least once during one travel. Therefore, in the period from when the IG switch 30 is turned on until it is turned off, namely during one travel, wear state data is requested once to the tire-side device 1. At this time, when an affirmative determination is made at S230 and a negative determination is made at S240, the process proceeds to S250 so that a request signal for wear state data is sent when the accumulation time for traveling after the IG switch 30 is turned on is equal to or less than, for example, 10 minutes.

Meanwhile, when the accumulation time for traveling after IG is turned on exceeds the predetermined time and a request signal for wear state data has already been sent and a negative determination is made at S230 or an affirmative determination is made at S240, the process proceeds to S260. At S260, the data waiting process is performed. The data waiting process is explained referring to FIG. 8.

The data waiting process is performed in the control unit 21*b* in every predetermined control cycle. First, at S300, the data receiving step which receives the data sent from each tire-side device 1 is performed. Then, after the data is received, the process proceeds to S310 and the control unit 21*b* determines whether or not the received data is load data. When an affirmative determination is made here, the process proceeds to S320 and the load on each wheel is calculated by the above method on the basis of the load data from each tire-side device 1 and the result is transmitted to the torque control ECU 24 or brake ECU 23. Then, the process is ended.

When a negative determination is made at S310, the process proceeds to S330 and whether or not the received data is wear state data or tire air pressure data is determined. When an affirmative determination is made here, the process proceeds to S340. When the received data is wear state data, the wear state of each tire 3 is calculated on the basis of the data and the vehicle travel distance information transmitted from the navigation ECU 22 by the above method and the result is transmitted to the notification device 26. When the received data is tire air pressure data, the tire air pressure is obtained from the data and the result is transmitted to the notification device 26. Then, the process is ended.

When a negative determination is made at S330, the process proceeds to S350. In this case, since the received data is road surface data, the feature amount included in the data is compared with the all of the support vectors to determine the degree of similarity and the road surface state of the road surface on which the vehicle travels is determined on the basis of the degree of similarity. Then, the result of determination of the road surface state is transmitted to the brake ECU 23 and the process is ended.

As explained above, in the waiting process, the data sent from each tire-side device 1 is received and depending on the type of the received data, the road surface state or wear state is detected or the load on each wheel is detected and the result can be transmitted to various units of the vehicle-body-side system 2.

The vehicle-body-side system 2 and the communication center 200 communicate with each other. Consequently, mapping of the road surface state is performed by the communication center 200 and the road surface data indicating the road surface state, etc. which is collected in the database of the communication center 200 is provided to the vehicle-body-side system 2.

Figure 9:
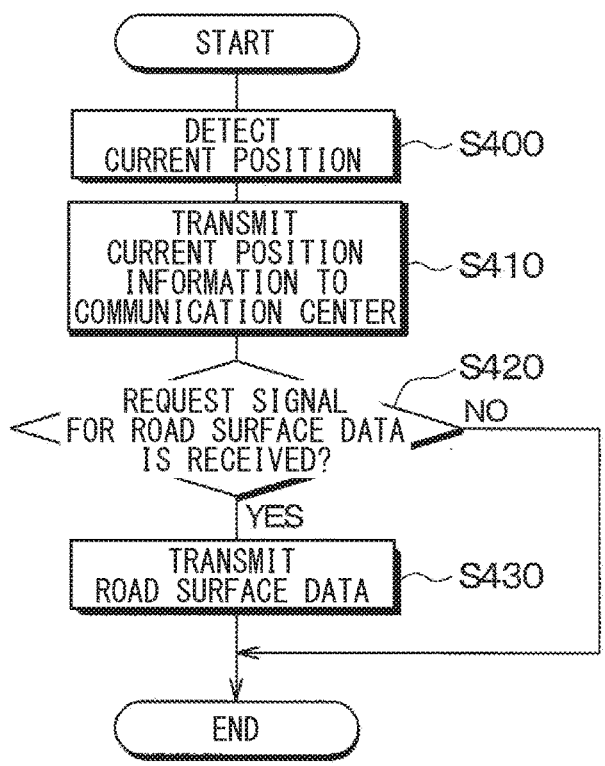
FIG. 9 is a flowchart showing details of a mapping data transmission process performed by a control unit of a receiver.
Figure 10:
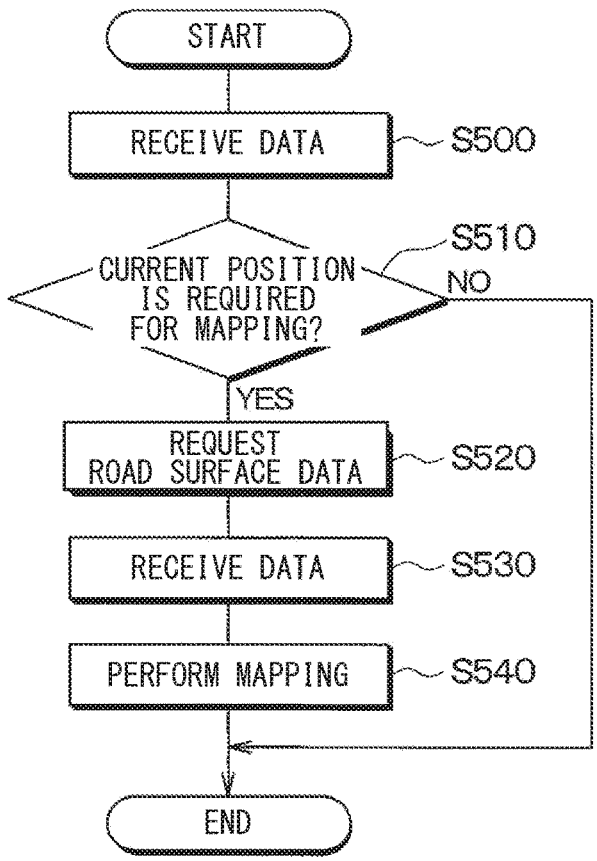
FIG. 10 is a flowchart showing details of a mapping process performed by a communication center.

Mapping by the communication center 200 will be explained referring to FIG. 9 and FIG. 10. FIG. 9 shows details of the mapping data transmission process which is performed by the control unit 21*b* for mapping by the communication center 200 and performed in every predetermined control cycle. FIG. 10 is a mapping process which is performed by the communication center 200 and carried out in every predetermined control cycle by a control unit (not shown) provided in the communication center 200, such as a microcomputer.

First, as shown in FIG. 9, at S400 the control unit 21*b* detects the present position. This process is performed by obtaining the present position information from the navigation ECU 22. Then, the process proceeds to S410 and the control unit 21*b* sends the present position information to the communication center 200. At this time, the present position information is sent to the communication center 200 with the ID information determined for each vehicle so that the communication center 200 can identify the vehicle.

Meanwhile, as shown in FIG. 10, the communication center 200 performs the data reception process at S500 to receive data from the vehicle-body-side system 2 of each vehicle. Upon receiving the data, the communication center 200 proceeds to S510 and, according to the present position information included in the data, determines whether or not the present position of the vehicle sending the data is a position required for mapping. When a negative determination is made here, the process is ended. When an affirmative determination is made, the process proceeds to S520 and a request signal to request road surface data is sent to the vehicle sending the data. Then, at S530, the road surface data reception process is performed.

As shown in FIG. 9, the control unit 21*b* proceeds to S420 after processing at S410 and determines whether or not a request signal for road surface data has been received. As mentioned above, when a request signal for road surface data is sent from the communication center 200, an affirmative determination is made at S420. When an affirmative determination is made at S420, the process proceeds to S430 and, after the road surface data is sent, the process is ended. At this time, the road surface data including the feature amount which is sent from each tire-side device 1 may be sent as it is or the data which indicates the result of detection of the road surface state by the control unit 21*b* may be sent as road surface data. It is also acceptable to send the data which includes both the feature amount and the result of detection of the road surface state, as road surface data.

Furthermore, when a request signal for road surface data is sent from the communication center 200, it is also possible to output a request signal for requesting road surface data to the tire-side device 1 so that the tire-side device 1 generates and sends the road surface data even not in the normal measurement mode. Specifically, when the vehicle is going to travel at a point required by the communication center 200, the communication center 200 can instruct the vehicle to send road surface data and upon receiving the instruction, the vehicle-body-side system 2 can request the tire-side device 1 to send the road surface data. In this case, the tire-side device 1 generates road surface data according to the detection signal of the vibration sensor unit 11 even not in normal mode measurement and sends the road surface data to the vehicle-body-side system 2. Since the communication center 200 can estimate the point at which the vehicle will travel, from the present position information sent from the tire-side device 1, it can transmit the position information of the point to the vehicle-body-side system 2 before the vehicle travels at the point. Consequently, when the vehicle travels at the point, the road surface data for the point can be obtained by sending a request signal from the receiver 21 to the tire-side device 1.

When the vehicle sends the road surface data, after the data is received at S530 as shown in FIG. 10, the process proceeds to S540 and the communication center 200 performs mapping on the basis of the received road surface data. In other words, the communication center 200 updates the information on the road surface state of each place on each road in the map data stored in the database, on the basis of the received road surface data. Consequently, mapping of the road surface state with changing over time is performed.

Since the communication center 200 manages the database which stores the information of the road surface state of each place on each road, the communication center 200 can send the road surface data to the vehicle communication device 25 of each vehicle to provide the road surface data for the road on which the vehicle is going to travel.

As explained so far, in the tire system 100 in this embodiment, the vehicle-body-side system 2 sends a request signal to each tire-side device 1 to transmit the required data. Specifically, when wear state data or load data is required, a request signal which indicates that such data is required is sent.

Therefore, the control unit 13 of each tire-side device 1 can grasp the vehicle state according to the request signal and send the required data at an adequate time point for the vehicle state to the vehicle-body-side system 2. Furthermore, when processing the detection signal of the vibration sensor unit 11, the control unit 13 can deal with a plurality of detection targets by switching the detection signal processing algorithm according to the request signal. Consequently, the detection result can be obtained by one control unit 13 according to the detection signal of one vibration sensor unit 11. This eliminates the need to provide a plurality of vibration sensor units and a plurality of microcomputers for each tire-side device 1 or the need to provide a microcomputer with a high processing capability. Thus, the increase in the weight and the physical size of the tire-side device 1 can be suppressed and power consumption can be reduced.

The vehicle-body-side system 2 does not send a request signal for all detection targets, but the tire-side device 1 makes normal mode measurement at a predetermined time point for the road surface data which is required relatively frequently. Therefore, the road surface data can be sent even without a request signal from the vehicle-body-side system 2. However, it is acceptable that the road surface data is also sent according to a request signal from the vehicle-body-side system 2.

Other Embodiment

While the present disclosure has been described in accordance with the embodiments described above, the present disclosure is not limited to the embodiments and encompasses various modifications and variations in the equivalent range. In addition, various combinations and modes, and further, other combinations and modes including only one element thereof, less or more, are intended to fall within the scope and spirit of the present disclosure.

For example, in the above embodiment, as a plurality of types of detection targets related to the tire 3, the road surface state, the wear state of the tire 3, the load applied to each wheel and tire air pressure are given as examples. However, these are just examples. Specifically, data on detection targets is generated according to detection signals for a plurality of types of detection targets output by a sensing unit such as the vibration sensor unit 11 or the air pressure detection unit 12. When the data is transmitted from the tire-side device 1 to the vehicle-body-side system 2, this disclosure can be applied. All of the road surface state, the wear state of the tire 3 and the load applied to each wheel need not be detection targets. One or more of them may be a target or detection targets. Alternatively, something other than these may be a detection target. Although the vibration sensor unit 11 and air pressure detection unit 12 are given as examples of the sensing units, anything that outputs a detection signal to detect another detection target may be a sensing unit.

In addition, each of the various values acquired to detect a plurality of types of detection targets related to the tire 3, such as the road surface state, the wear state of the tire 3 or the load applied to each wheel, can be a detection target. For example, in the above embodiment, the feature amount of tire G, the ground contact area and the rotation speed of the tire 3 are calculated from the detection signal of the vibration sensor unit 11. Based on these values, the above several types of detection targets related to the tire 3 are detected. The feature amount of tire G, ground contact area, or rotation speed of the tire 3 as described here can also be a detection target to be detected from the detection signal of the vibration sensor unit 11. Furthermore, even when something other than the detection targets described here is a detection target, the tire-side device 1 can make a detection according to a request signal from the vehicle-body-side system 2. Then, the detection result can be sent from the tire-side device 1 at an adequate time point.

Regarding various values, the same value can be grasped as a plurality of detection targets. For example, the feature amount of tire G can be grasped as a plurality of detection targets. Specifically, different waveform processing methods are available for the feature amount of tire G and the feature amount of tire G which is obtained by each waveform processing can be each grasped as a detection target. In this case, the feature amounts of tire G are grasped as a plurality of detection targets. For example, when the feature amount, particularly the feature amount related to a dry road surface is requested for the road surface state or the feature amounts for a wet road surface, frozen road and a snow-covered road are requested, namely when more detailed determination of the road surface state is expected, the requested feature amounts may be different. In that case, the waveform processing algorithms for the detection signal of the vibration sensor unit 11 may be different. When that is the case, even though the feature amount of tire G is set as the detection target, the requested feature amounts are different, which means there are a plurality of detection targets.

In the above embodiment, the vibration sensor unit 11 which constitutes the vibration detection unit is exemplified by an acceleration sensor. However, another element that can detect vibration, for example, a piezoelectric element can constitute the vibration detection unit.

In the above embodiment, data including the feature amount is used as road surface data which indicates the road surface state represented by the detection signal of the vibration sensor unit 11. However, this is also just an example and other data may be used as road surface data. For example, the integrated value data of the vibration waveforms of the five periods R1 to R5 included in the vibration data for one rotation of the tire 3 may be used as road surface data or the raw data of the detection signal itself may be used as road surface data.

In the case of the above embodiment, the receiver 21 not only determines the hazard of the vehicle based on the road information, present position information, vehicle speed and the road surface data transmitted from the communication center 200, but also functions as the control unit which instructs the notification device 26 to warn of the hazard of the vehicle. However, this is just an example. A control unit other than the receiver 21 may be provided or another ECU such as the navigation ECU 22 or brake ECU 23 may function as the control unit.

Furthermore, the tire-side device 1 may store the support vector so that the tire-side device 1 can determine the road surface state and send the data indicating the determination result of the road surface state as road surface data to the vehicle-body-side system 2. Regarding the load, not only the method which makes a calculation from the ratio of the ground contact areas of the four wheels but also the method which makes a calculation from the relation between tire air pressure and ground contact area may be adopted. In that case, since each tire-side device 1 can calculate the load, the load may be calculated in each tire-side device 1 so that the calculation result is transmitted to the vehicle-body-side system 2.

In the above embodiments, the tire-side device 1 is provided for each of several tires 3, but at least one tire-side device 1 may be provided.

What is claimed is:

1. A tire system comprising:
    a tire-side device attached to a tire of a vehicle and configured to transmit data related to a detection target among a plurality of types of detection targets related to the tire; and
    a vehicle-body-side system attached to a body of the vehicle and configured to receive the data and acquire a detection result for the detection target, wherein:
    the tire-side device includes
        a sensing unit configured to output a detection signal corresponding to each of the plurality of types of detection targets,
        a signal processing unit configured to perform processing of the detection signal and generate the data related to the detection target, and
        a first data communication unit configured to perform bidirectional communication with the vehicle-body-side system and transmit the data to the vehicle-body-side system;
    the vehicle-body-side system includes
        a second data communication unit configured to perform bidirectional communication with the tire-side device and receive the data, and
        a control unit configured to acquire the detection result for the detection target based on the data;
    the vehicle-body-side system transmits a request signal that requests which detection target is required among the plurality of types of detection targets to the tire-side device through the second data communication unit;
    the tire-side device generates, based on the request signal, the data related to the detection target indicated by the request signal and transmits the data to the vehicle-body-side system through the first data communication unit;
    the plurality of types of detection targets include a wear state of the tire and a road surface state of a road surface on which the tire is traveling;
    the vehicle-body-side system transmits, as the request signal, a signal indicating that the detection target is the wear state at least once in a period from a time point when a start switch of the vehicle is turned on to a time point the start switch is turned off;
    when the signal indicating that the detection target is the wear state is transmitted as the request signal, the tire-side device generates data related to the wear state and transmits the data to the vehicle-body-side system through the first data communication unit; and
    when the request signal is not transmitted, the tire-side device generates data related to the road surface state as the detection target by measuring in a normal mode and transmits the data to the vehicle-body-side system through the first data communication unit.

2. The tire system according to claim 1, wherein
the vehicle-body-side system transmits, as the request signal, the signal indicating that the detection target is the wear state only once in the period.

3. The tire system according to claim 1, wherein
the vehicle-body-side system transmits, as the request signal, the signal indicating that the detection target is the wear state when an accumulation time for traveling after the start switch is turned on is equal to or less than a predetermined time.

4. The tire system according to claim 1, wherein:
the vehicle-body-side system further includes
    a vehicle communication device configured to transmit the data related to the road surface state to a communication center that collects road information and acquire data related to a road surface state of road on which the vehicle is going to travel from the communication center, and
    a position information acquisition unit configured to acquire present position information of the vehicle;
when transmitting the present position information to the communication center through the vehicle communication device and receiving a request signal that requests the data related to the road surface state transmitted from the communication center, the vehicle-body-side system transmits a request signal indicating that the detection target is the road surface state to the tire-side device through the second data communication unit; and
when the request signal indicating that the detection target is the road surface state is transmitted, the tire-side device generates the data related to the road surface state even not in the normal mode and transmits the data to the vehicle-body-side system through the first data communication unit.

5. The tire system according to claim 1, wherein:
the plurality of types of detection targets include a load of a wheel to which the tire is attached;
the vehicle-body-side system transmits, as the request signal, a signal indicating that the detection target is the load used for control of vehicle movement; and
when the signal indicating that the detection target is the load is transmitted as the request signal, the tire-side device generates data related to the load and transmits the data to the vehicle-body-side system through the first data communication unit.

6. The tire system according to claim 1, wherein:
the plurality of types of detection targets include a load of a wheel to which the tire is attached;
the vehicle-body-side system transmits, as the request signal, a signal indicating that the detection target is the load used for control of vehicle movement;
when the signal indicating that the detection target is the load is transmitted as the request signal, the tire-side device generates data related to the load and transmits the data to the vehicle-body-side system through the first data communication unit; and
when the request signal is not transmitted, the tire-side device generates, as the detection target, the data related to the wear state or the data related to the road surface state by measuring in the normal mode and transmits the data to the vehicle-body-side system through the first data communication unit.

* * * * *